United States Patent [19]
Hansen

[11] 3,849,294
[45] Nov. 19, 1974

[54] CATALYTIC CRACKING PROCESS IMPROVEMENT

[75] Inventor: Andrew C. Hansen, Palatine, Ill.

[73] Assignee: Universal Oil Products Company, Des Plaines, Ill.

[22] Filed: Feb. 15, 1973

[21] Appl. No.: 332,867

[52] U.S. Cl. .............................. 208/162, 208/103
[51] Int. Cl. ............................................. C10g 11/18
[58] Field of Search ............................ 208/162, 103

[56] References Cited
UNITED STATES PATENTS

| | | | |
|---|---|---|---|
| 2,447,149 | 8/1948 | Wier | 208/162 |
| 2,449,095 | 9/1948 | Wheeler et al. | 208/162 |
| 2,918,424 | 12/1959 | Nathan | 208/162 |
| 2,999,062 | 9/1961 | Henderson | 208/103 |

Primary Examiner—Herbert Levine
Attorney, Agent, or Firm—James R. Hoatson, Jr.; Robert W. Erickson; William H. Page, II

[57] ABSTRACT

A fluidized conversion process in which the vaporous effluent stream from a fluidized reaction zone which contains entrained catalyst particles is passed into a catalyst disengaging zone where the vaporous effluent and entrained catalyst particles contact a liquid hydrocarbon to cause entrapment of the catalyst particles by the liquid and condensation of some of the effluent vapors. The resulting slurry oils are recovered from the disengaging zone and may be recycled through the zone, with the remaining effluent vapors passing to a normal fractionating zone to recover various liquid components of the vaporous effluent. Some of the liquid components recovered from the fractionating zone may be recycled to be used as a liquid contacting medium in the catalyst disengaging zone. This process is applicable to most all conversion processes including fluidized catalytic cracking and fluidized catalytic dehydrogenation.

12 Claims, 1 Drawing Figure

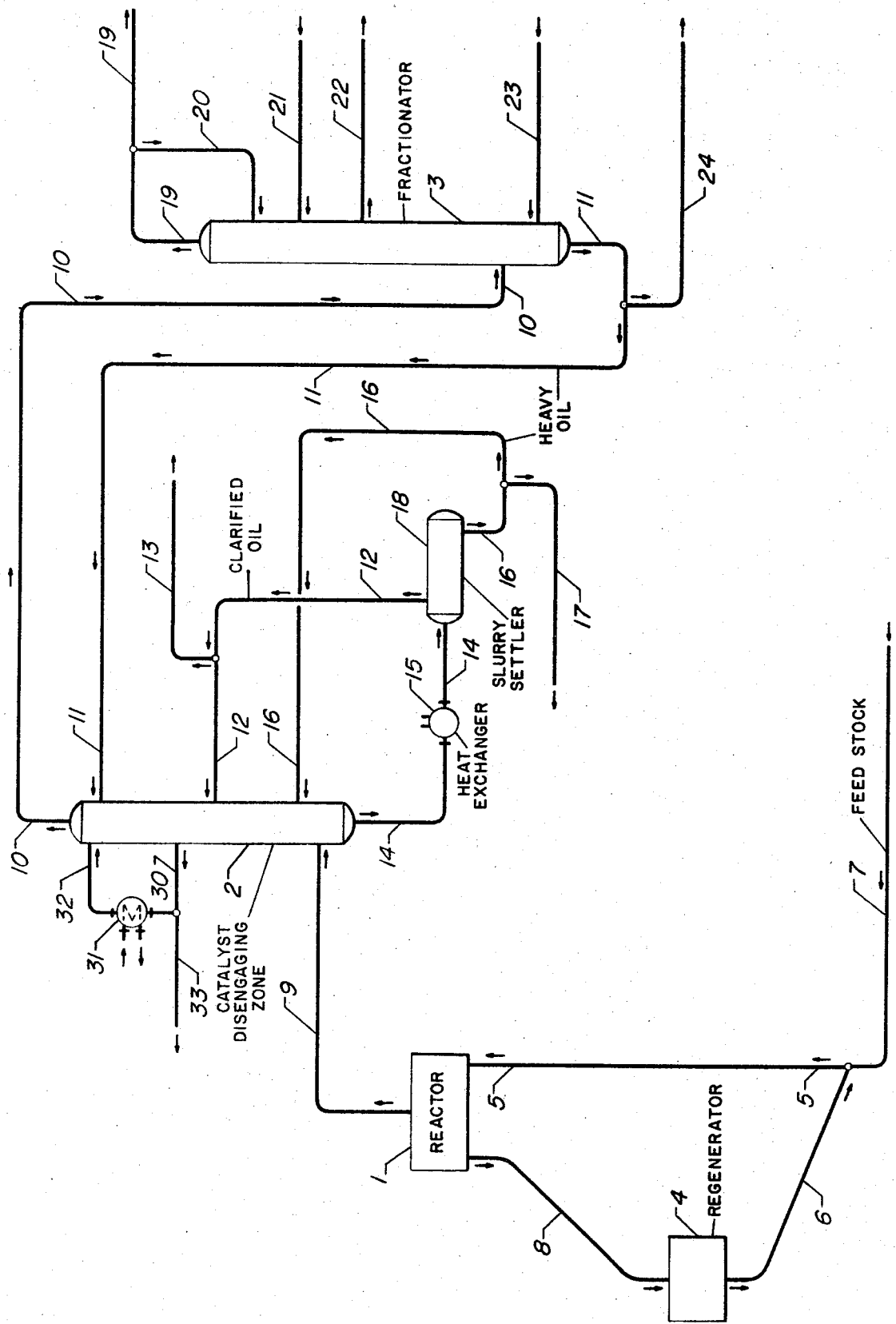

CATALYTIC CRACKING PROCESS IMPROVEMENT

BACKGROUND OF THE INVENTION

1. Field of the Invention

The field of art to which this invention pertains is fluidized hydrocarbon processing. More particularly, the field of art to which this invention relates is catalytic cracking processes in which a vaporous effluent from a fluidized reaction zone which contains entrained catalyst particles is contacted with liquid hydrocarbons to cause condensation of some of the effluent vapors and the recovery of entrained catalyst particles.

2. Description of the Prior Art

In the prior art, especially the fluidized catalytic cracking art, a fluidized stream of catalyst and hydrocarbon feed stock are contacted in a reaction zone. The mixture of hydrocarbons and catalyst is passed into cyclone separation means to be separated into a vaporous effluent stream which generally contains small quantities of entrained catalyst and a spent catalyst stream. The vaporous effluent, along with entrained catalyst particles, typically goes into what the art refers to as a main column to be separated into various fractionated products such as light gases, gasoline, light cycle oil, heavy cycle oil and slurry oil. Typically, the carry over of entrained catalyst into the main column requires that it be designed with its feed introduction point low enough and with trays below the feed introduction point designed to prevent a build up of catalyst particles, and in such a manner prevent plugging of the bottom portion of the main column. The heaviest stream removed from the main column contains appreciable quantities of catalyst fines which have been carried over from the cracking reaction zone. The bottom stream from the main column passes into a holding zone, also referred to as a clarifier or slurry settler, where the bottom material can be cooled and then held up for a sufficient period of time to allow the catalyst particles to settle to the lower portion of the holding zone. The portion removed from the top of the settler is typically referred to as clarified slurry oil and can be recycled back into the main column as reflux. Typically, the bottom portion of the oil from the slurry settler (slurry oil) eventually is passed back into the reaction zone to recover catalyst in the slurry oil and to produce lighter products by further reaction in the reaction zone. The above method of operation is present in almost all fluidized catalytic cracking reaction zones presently utilized.

U.S. Pat. No. 2,948,670 (Cl. 208-100) shows the placement of a fractionation and mixing zone on top of a fluid coker to increase the recovery of gas oil by quenching the hot coker vapors with cool gases. This is taught as reducing the gas oil partial pressure to consequently raise the gas oil cut point and increase the gas oil yield. This patent is believed to be the closest prior art, and does not teach removal of particulate matter by entrapment in recycled liquid streams.

SUMMARY OF THE INVENTION

My invention can be summarized as a hydrocarbon conversion process in which a vaporous effluent from a fluidized conversion zone which contains entrained catalyst is contacted with a liquid hydrocarbon to remove entrained catalyst particles from the effluent vapor and to partially condense the vapor to a liquid and to recover the condensed liquid and catalyst particles prior to the passage of the vaporous effluents out of a catalyst disengaging zone for further processing or use.

A broad embodiment of the process of my invention relates to a fluidized catalytic conversion process which comprises: (a) contacting a feed stock with a fluidized catalyst in a reaction zone at reaction conditions to effect the conversion of said feed into product effluent vapors; (b) separating effluent vapors which contain entrained catalyst particles from fluidized catalyst; (c) contacting said effluent vapors with a liquid hydrocarbon stream in a catalyst disengaging zone to condense a portion of said effluent vapors and to recover entrained catalyst; (d) recovering a liquid oil bottoms material comprising catalyst particles, condensed effluent and liquid hydrocarbons from said disengaging zone; (e) recycling at least a portion of said liquid oil bottoms material to said catalyst disengaging zone as at least a portion of said liquid hydrocarbons stream of step (c); and, (f) recovering effluent vapors substantially free of entrained catalyst from said catalyst disengaging zone.

BRIEF DESCRIPTION OF THE DRAWING

The attached drawing shows one specific embodiment of the process of my invention. The drawing is presented to simply illustrate the processing flow and does not include various control valves, heat exchangers and process instrumentation which are needed to reasonably control the overall process operations.

The specific flow diagram shown in the drawing can be applied to a fluidized catalytic cracking operation. The fluidized catalytic cracking reception vessel or reaction zone 1 has passing to it a riser transfer conduit 5 which receives fresh feed via line 7 and freshly regenerated catalyst from regenerator 4 via line 6. The catalyst and feed stock commingle and pass in an upward direction through riser 5 into the reaction vessel. Within the reaction vessel there is typically located cyclone separation means which cause substantial separation of effluent vapors from the catalyst particles carried into the reaction zone. Sustantially all of the catalyst particles which have contacted the feed stock, and which contain appreciable quantities of coke pass out of the reaction zone 1 via line 8 and into regeneration zone 4. However, the reaction zone effluent vapors passing through line 9 still contain a measurable quantity of entrained catalyst particles which in most instances are not easily separable from the effluent vapors by presently used cyclone separation means configurations.

In the drawing, which embodies an essential description of my invention, line 9 carries the catalyst entrained effluent vapors and passes into a catalyst disengaging zone labeled 2. The catalyst disengaging zone 2 allows the effluent vapors which pass into it through line 9 to be contacted with one or more liquid hydrocarbons to cause partial condensation of the effluent vapors and washing of the vapors of entrained catalyst particles by the liquid hydrocarbons. It is preferred that the catalyst disengaging zone 2 be designed so that the liquid hydrocarbons and entrained catalyst contact each other in a countercurrent fashion. Preferably, the effluent vapors pass into a lower portion of the catalyst disengaging zone and the liquid hydrocarbons pass into that zone at a point above the vapor effluent introduction point. In this manner, a downflowing stream of liquid can contact an upflowing stream of vapors and can cause condensation and collection of the condensed liquid and entrapment of catalyst particles in the condensed liquid. The liquid can be recovered from lower and bottom portions of the catalyst disengaging zone.

In the catalyst disengaging zone 2, a heavy bottoms liquid oil material which contains condensed effluent vapors, catalyst particles, and liquid hydrocarbons passed into the catalyst disengaging zone via lines 16, 12 or 11 is withdrawn from a lower or bottom portion of the catalyst disengaging zone 2. This heavy liquid oil is removed via line 14 and preferably passes through a heat exchanger 15, wherein the material passing through line 14 is cooled, and then passed into a slurry settler 18 which has a sufficient hold up time to cause substantially all or most of the catalyst contained in the liquid passing through line 14 to settle to a lower portion of the slurry settler 18. A clarified oil is removed, preferably from the top portion of slurry settler 18, via line 12 and portions can be removed from the process via line 13 and recovered as product or used for further processing in the catalytic cracking reaction zone or other reaction zones. A portion, or in some instances, all of the clarified oil is eventually recycled via line 12 to the catalyst disengaging zone 2.

A slurry oil is removed from the bottom portion of slurry settler 18 via line 16, and in some instances may be recycled to the catalyst disengaging zone 2 via line 16. In other instances, a portion or all of the slurry oil may be recovered via line 17, to be collected and/or passed into a catalytic cracking reaction zone to recover the catalyst contained in this slurry oil, and possibly convert some of the hydrocarbons in this stream into more valuable lower molecular weight components. Also shown in the catalyst disengaging zone 2 is line 11 which receives what is referred to as a heavy cycle oil, or the bottom or heaviest fraction from the main column 3, and in a preferable instance can pass a portion or all of the heavy cycle oil back to the catalyst disengaging zone to help in condensing and recovering catalyst particles from the vaporous effluent passing into the catalyst disengaging zone.

Shown near the top of the catalyst disengaging zone 2 is an optional heavy cycle oil pump around loop in which liquid heavy cycle oil and combined condensed hydrocarbons may be withdrawn from a fractionation tray via line 30. The liquid hydrocarbons may be pumped by a means not shown through line 32 containing heat exchanger 31 used to cool the liquids, and then returned to the catalyst disengaging zone via line 32 to serve as reflux for this upper portion of the catalyst disengaging zone used to fractionate the reaction zone effluent. The use of this pump around loop and intermediate draw off lessens mixture of the heavy cycle oil with the heavy oil drawn off the catalyst disengaging zone via 14, and supplies cooling to the top of the catalyst disengaging zone to increase the condensation of hydrocarbons from the reaction zone effluent. When this heavy cycle oil pump around loop is used, line 11 would be used mainly to supply make up heavy cycle oil to the top portion of the catalyst disengaging zone. Part of this make up would be required to replace heavy cycle oil vaporized and passed out of the catalyst disengaging zone via line 10 and part of the make up would be to replace heavy cycle oil drawn off through line 33. This draw off also would contain the hydrocarbon liquid formed by the partial condensation and fractionation of the reaction zone effluent, and may be passed directly to some other processing unit or to the main column 3 to be described hereinafter.

It can be seen that the basic functions of the catalyst disengaging zone 2 are to recover substantially all of the catalyst entrained in the vaporous effluent passing into that zone and to cause, via the introduction of preferably cooled liquid hydrocarbon streams into the catalyst disengaging zone, the condensation of selected portions of the vaporous effluent streams passing into the catalyst disengaging zone 2 via line 9. The preferable arrangement of input of liquid hydrocarbons passing into the catalyst disengaging zone 2 is shown and is designed so that when slurry oil is recycled to the catalyst disengaging zone, it passes into the disengaging zone above the effluent vapor feed point introduction and below any other optional liquid hydrocarbon input streams. The reasons for this is that the slurry stream contains catalyst particles and is preferably desired to be contained within a lower portion of the catalyst disengaging zone. As can be seen, line 12 which carries clarified oil should pass into the catalyst disengaging zone preferably at least above the feed point introduction of slurry oil. This stream preferably is also cooled and generally contains essentially no or very little catalyst particles as compared to the slurry oil and consequently its introduction into the catalyst disengaging zone at a point above the introduction of slurry oil helps to prevent entrainment of catalyst beyond this feed point introduction. In an even more preferable instance and those in which essentially no catalyst will be passed out of the catalyst disengaging zone via catalyst-free vaporous effluent outlet line 10, a heavy cycle oil from the main column is passed into the catalyst disengaging zone 2 at an uppermost location. This stream preferably can be cooled after being recovered from the main column and, if the catalyst disengaging zone is functioning properly, should contain essentially no catalyst particles. Because of the nature of this stream (essentially no catalyst particles contained within it), this stream can be used as a final wash to both condense and recover the last portions of the catalyst particles entrained in the vapors passing in an upward direction and out of the catalyst disengaging zone 2.

The effluent vapors passing out of the catalyst disengaging zone are substantially free of entrained catalyst particles and pass via vapor transfer line 10 into main column 3. Main column 3 is essentially designed as would normally be encountered in the field or in the prior art processes except the present and preferable main column utilized in the combination of my process has its bottom portion removed as compared to other main columns normally used. The reason for this is that the essential functions of the bottom portion of the prior art main column take place in the catalyst disengaging zone 2.

In main column 3, there can be removed via overhead line 19 the overhead products from the main column which generally comprise liquid gasoline components and lighter gaseous components. These materials can be removed via line 19 and passed into a condensation zone to form the gasoline liquid and vapor products. A portion or all of the gasoline and gaseous materials may be condensed and passed back to the main column via line 20 as reflux to help maintain top temperature control and stabilized operation on the main column.

Below the overhead outlet stream is located what is generally referred to as a light cycle oil draw off tap 22. Line 22 carries what the art refers to as light cycle oil material which can be passed into a light cycle oil stripper or condenser to recover lighter components from the light cycle oil or pass a portion of them back into the main column. A portion of the liquid light cycle oil or condensed vapor products from the light cycle oil may be passed as reflux back to the main column via line 21 which preferably is located above the draw off line 22. In some instances, the reflux streams may be located below the draw off streams for their respective product materials in the main column, depending upon the design and construction of the main column.

At the bottom most portion of the main column 3 there is line 11 which is the heavy cycle oil draw off location on the main column. Heavy cycle oil desired to be removed or used as reflux is drawn off of the main column via lines 11 and 24. A portion of the heavy cycle oil may be passed back into the main column through line 23 as a reflux stream to maintain bottom temperature control. This reflux stream is typically located below the feed input stream passing into the main column via line 10. Regulated portions of the heavy cycle oil removed from the column can be passed to the catalyst disengaging zone via line 11 as mentioned above to remove the last traces of catalyst and help condense effluent vapor materials.

The basic distinction between the main column 3 described and shown in my drawing and most main columns utilized in industry centers around the fact that the main column used in my invention generally has a bottom section from which heavy cycle oil is removed and in which there is no condensation of slurry oil or entrapment of catalyst particles into condensed liquid in the column. The catalyst disengaging zone is essentially the bottom portion of a normal main column except for the fact that the operation within it is sufficiently different from the normal bottom section of the main column in that the feed stock to the catalyst disengaging zone comes directly from the hydrocarbon conversion reaction zone and the feed stock passed to the main column in my invention comprises effluent vapors which have had heavier products and catalyst removed therefrom.

DETAILED DESCRIPTION OF THE INVENTION

My invention relates to an improved processing sequence in which an effluent stream from a hydrocarbon conversion zone, and particularly a fluidized catalytic cracking reaction zone, passes into a catalyst disengaging zone which is separate and distinct from the main column. In this zone, the effluent vapors along with entrained catalyst contact heavy liquid hydrocarbon which causes partial condensation of the effluent vapors along with the entrapment of the entrained particles into the heavy and condensed liquids. In this manner, the catalyst particles can be recovered prior to the passage of the remaining vaporous effluent material into the main column, which need not be designed to specifically operate with entrained catalyst in the feed stock to that column.

My invention allows many advantages in design of a main column, and in particular allows a reduced size of the main column since a portion of fractionation which normally takes place in the bottom portion of the main column takes place in the catalyst disengaging zone. Secondly, the main column need not be designed to receive entrained catalyst, since the catalyst which is entrained in the reaction zone effluent eventually is recovered in the catalyst disengaging zone prior to the passage of any material into the main column. Another advantage is the reduction in the metallurgy required in the effluent vapor line which carries feed to the main column. The vapor line may now be constructed of carbon steel rather than alloy steel. Since a portion of the vaporous effluent material from the reaction zone is condensed in the catalyst disengaging zone, the line carrying the vapor stream to the main column may be reduced in size. Also, this line into the main column need not be maintained at a high temperature to prevent liquid phases from condensing, since a sizeable portion of the condensible hydrocarbons in the effluent vapors have already been condensed. Still another advantage of the present invention is that the reaction zone vapors are more quickly quenched from about 1,000°F. to about 700°F. to reduce the amount of thermal degradation to the product stream.

Vaporous effluent material shall generally refer to vaporous hydrocarbons removed from a hydrocarbon reaction zone, particularly a catalytic cracking reaction zone, which may contain measurable quantities of entrained fluidized catalyst. The vaporous effluent material passes into a catalyst disengaging zone where it is contacted with a liquid hydrocarbon stream.

The liquid hydrocarbon stream can comprise any material which is cooler than the vaporous effluent and typically can be selected from materials such as slurry oil, clarified slurry oil, heavy cycle oil or other oils either derived from the main column or from other processes within the refinery complex. It is preferred that the liquid hydrocarbons be selected from the group above mentioned in order to utilize some of the products removed from the main column fractionating zone. Some of the liquid hydrocarbon streams should contain essentially no catalyst materials so they can be used as a final washing liquid hydrocarbon to contact the vaporous effluent material prior to its ultimate passage out of the catalyst disengaging zone and into a downstream fractionation zone. It is preferred that the liquid hydrocarbon streams which pass into the catalyst disengaging zone all enter at a point above the input feed inlet of the effluent vaporous hydrocarbons.

Specifically, and in one preferred embodiment, vaporous effluent materials pass into a lower portion of the catalyst disengaging zone. A first liquid hydrocarbon comprising a slurry oil which is part of the bottoms material recovered from the catalyst disengaging zone and which has a high concentration of catalyst contacts the rising vapors causing condensation and entrapment of the catalyst particles within the slurry liquid. A second stream comprising clarified slurry oil also recovered from the bottom portion of the catalyst disengaging zone passes into that zone at a point above the introduction of the slurry oil to both condense and further remove catalyst particles from the upflowing vapor stream. In a more preferable instance, a third liquid stream passes into an uppermost location of the catalyst disengaging zone to finally remove any catalyst particles still remaining in the upflowing vaporous material before they are passed into the fractionation zone.

Preferably, the third liquid stream comprises heavy cycle oil which is recovered from the external fractionation zone. In a still more preferred embodiment heavy cycle oil and condensed hydrocarbons are removed from a midpoint of the catalyst disengaging zone, cooled and returned to a higher point in the catalyst disengaging zone to promote the condensation and fractionation of hydrocarbons emerging from the reaction zone.

Various other combinations or different liquid hydrocarbon streams may be utilized to both condense and wash the catalyst from the uprising effluent vapors. In some instances, slurry oil may first contact the uprising vapors followed by a second hydrocarbon comprising heavy cycle oil. In other instances, only a slurry oil liquid hydrocarbon may be utilized and in still other instances only a clarified slurry oil may be utilized. The choice of one or more liquid hydrocarbons to contact the uprising vaporous effluent materials in the catalyst disengaging zone is determined by the quantity of catalyst entrained in the uprising vapors, the temperature of the vapors and their particular physical characteristics. In some instances, a light cycle oil may be utilized as the sole disengaging liquid but in these instances it is preferable that the effluent material contain relatively small quantities of entrained catalyst.

The liquid hydrocarbon streams passing into the catalyst disengaging zone may, in addition to being utilized to remove entrained catalyst from the uprising vapors and to cause condensation of those vapors, also be utilized as reflux within the catalyst disengaging zone to maintain temperature gradients throughout the catalyst disengaging chamber to carry out the fractionation operations which take place in the lower portion of a normal main column. Preferably, heavy cycle oil would be utilized as the reflux material passed into the uppermost portion of the catalyst disengaging zone to maintain its top temperature at a given level.

Temperatures of the streams passing into and out of the catalyst disengaging zone can vary depending upon the conversion operations taking place. Specifically, in catalytic cracking reaction zones, the vaporous effluent material removed from the reaction zone can generally be anywhere from about 800°F. up to about 1000°F. or higher depending upon the conditions within the reaction zone. The liquid hydrocarbon streams passing into the catalyst disengaging zone can also vary in temperature. Preferably in catalytic cracking operations the liquid temperatures would be from about 300°F. to about 600°F. In one embodiment in which three liquid input streams pass into the catalyst disengaging chamber, it is contemplated that the uppermost heavy cycle oil passing into the top of the catalyst disengaging chamber be around 450°-500°F. with the clarified slurry oil and slurry oil both recycled back through the catalyst disengaging chamber at locations respectively below the heavy cycle oil reflux stream at temperatures of around 500°F. The liquid oil bottoms stream removed from the catalyst disengaging chamber which contains catalyst, condensed vapors and liquid hydrocarbons would be generally around 650°-750°F. Preferably, this stream is heat exchanged to cool it and then passed into a settler to remove catalyst before being recycled back into the catalyst disengaging chamber at a temperature sufficiently low to cause the desired condensation from the uprising effluent vapors.

The term "heavy oil" or "heavy cycle oil" generally connotes a hydrocarbon stream in a catalytic cracking operation which boils somewhere between the bottoms material taken off the main column and the light cycle oil removed from the main column. Typically, the heavy oil or heavy cycle oil boils in the range of from above about 600°F. to about 1000°F. Typically, the heavy oil or heavy cycle oil is substantially free of entrained catalyst particles and in a preferred instance in this invention, the heavy oil or heavy cycle oil contains essentially no catalyst since the vapors which pass into my main column by using my inventive process are essentially or totally free of entrained catalyst.

The liquid oil bottoms stream generally refers to the bottom or heaviest material removed from the catalyst disengaging zone. Specifically, the liquid oil bottoms stream contains catalyst which has been trapped by the condensed vaporous effluent material and the liquid hydrocarbons. Typically, this stream is the heaviest boiling material present in the vaporous effluent material input. It is recovered from the catalyst disengaging zone, passed to a slurry settler wherein a clarified slurry oil and a slurry oil are recovered for use either as recycle liquid streams, or recovered or passed to other areas in this or other processes.

The reaction zone or fluidized reaction zone or, in preferable instances, the catalytic cracking reaction zone generally comprises a riser which passes into a vessel which can separate the catalyst from effluent vapors. The vessel generally contains a dense bed of fluidized catalyst which can be used to further contact the effluent vapors from the riser. Preferably, a riser reaction is utilized. In some cases the riser may pass directly into the vessel above the dense bed maintained therein. The effluent of the riser or reaction zone is often passed through a cyclone type separator designed to return the majority of the fluidized catalyst to the reaction zone prior to effluent leaving the reaction zone.

The main column fractionation zone generally includes a simple fractionator from which gaseous materials, gasoline, light cycle oil, heavy cycle oil, and in the prior art processes, bottoms slurry oil materials are recovered. The fractionating zone, as used in my claims, generally comprises a main column which does not effectively receive any entrained catalyst and which essentially separates gaseous materials, gasoline materials, light cycle oil and heavy cycle oil depending upon the boiling points of each. Typically, the fractionating zone of my invention is not designed to separate hydrocarbons when catalyst is passed into the main column. Also, the fractionating zone of my invention does not have a bottom section for separating material heavier that heavy cycle oil as is done in most prior art main columns, but instead my catalyst disengaging zone functions as the bottom section of the main column generally.

The catalyst disengaging zone typically is any type of vessel which can be utilized to both condense effluent vapors and to remove substantially, if not totally, all of the entrained catalyst from the vapors. Typically, the catalyst disengaging zone can be designed as a basic fractionator similar to the bottom section of most main columns. It is preferably elongated, with vaporous effluent material from the reaction zone passing into a lower portion of the catalyst disengaging zone and with vapors being removed from the zone at an uppermost point and containing essentially no entrained catalyst.

At various points above the effluent vapor input location one or more liquid hydrocarbon input streams having compositions as described above enter the zone. Preferably, at the lowermost portion of the catalyst disengaging zone there is a bottoms draw off stream from which a liquid oil bottoms stream can be removed, cooled and separated into clarified and slurry oil streams which can be further used. It is also preferred that an intermediate draw off such as line 30 be located at a midpoint of the vessel to remove condensed material from the cooled reaction zone effluent vapor in the upper portion of the disengaging zone.

In my process, it is desired that the catalyst disengaging zone be separate and distinct from the main fractionation zone. Condensation of vaporous reaction zone effluent passed to it and catalyst entrapment can then take place totally separated from the fractionation zone. The catalyst disengaging zone is only connected to the fractionation zone by a transfer line, as shown in my drawing as line 10, which can transfer vaporous effluent material which contains essentially no catalyst into the fractionation zone 3. Line 10 and any lines which carry liquid washing material from the fractionation zone to the catalyst disengaging zone are the only real connections between the catalyst disengaging zone 2 and the fractionation zone 3.

The catalyst employed for this process may be a silica prepared by the acid activation of a clay or a synthetically prepared zeolite. The catalyst, depending on the process use, may contain various metal components placed thereon to promote the desired catalytic activity. The catalyst may be in the form of a finely divided power having particle sizes varying from about 1 up to about 200 microns or greater in diameter. The size of the catalyst particles should be sufficiently small to allow them to be fluidized and carried through a riser by the feed stock to reaction zone.

The entrained catalyst particles which pass with the vaporous effluent into the catalyst disengaging zone are generally the smaller diameter particles which are contained in the reaction zone. Depending on the composition of the vaporous effluent, small or substantial portions of the catalyst passing through the reaction zone may be passed into the catalyst disengaging zone.

The vaporous effluent leaving the catalyst disengaging zone should contain very little, if any, catalyst. Preferably, that stream is substantially free of entrained catalyst, meaning less than about one-half wt. percent of this stream is catalyst. Even more preferably, this stream should contain no measurable quantities of catalyst particles.

I claim as my invention:

1. In a fluidized catalytic cracking process in which a feed stock contacts a fluidized catalyst in a reaction zone at conditions to effect the cracking of said feed stock into cracked products and wherein catalyst is separated from a vaporous effluent material from said reaction zone, which vaporous effluent material contains entrained catalyst particles, the improvement which comprises passing said vaporous effluent material into a catalyst disengaging zone and therein contacting the same with a liquid hydrocarbon stream at conditions to condense a portion of said vaporous effluent material and to remove entrained catalyst from said vaporous effluent, recovering from said catalyst disengaging zone a liquid oil bottoms stream comprising said catalyst and at least a portion of said liquid hydrocarbon and condensed effluent material, passing remaining catalyst-free vaporous effluent material from said catalyst disengaging zone into a fractionation zone and therein fractionally condensing the same to form an overhead gasoline-containing vapor and a heavy cycle oil stream substantially free of entrained catalyst particles and boiling in the range of from above about 600°F. to about 1,000°F., supplying at least a portion of said catalyst-free heavy cycle oil stream to the catalyst disengaging zone as at least a portion of said liquid hydrocarbon stream, and condensing said gasoline-containing vapor.

2. The process of claim 1 wherein said liquid oil bottoms stream is passed into a settling zone which divides said liquid oil bottoms stream into a slurry oil stream and a stream of clarified oil, said slurry oil stream having a higher concentration of catalyst than said clarified oil stream.

3. The process of claim 2 wherein at least a portion of said slurry oil stream is returned to the catalyst disengaging zone.

4. The process of claim 2 wherein at least a portion of said clarified oil stream is returned to the catalyst disengaging zone.

5. In a fluidized cracking process in which a feed stock contacts a fluidized catalyst in a reaction zone at reaction conditions to effect the cracking of said feed into a cracked product effluent, wherein effluent vapors which contain entrained catalyst particles are separated from said catalyst and passed into a fractionation zone to be separated into various boiling fractions including a heavy oil comprising the highest boiling components of said effluent and catalyst particles, and a heavy cycle oil, the improvement which comprises:

a. passing said effluent vapors into a catalyst disengaging zone and contacting said effluent vapors with a first liquid hydrocarbon stream and with a second liquid hydrocarbon stream and thereafter with a heavy cycle oil stream at conditions to condense a portion of said effluent vapors and recover entrained catalyst particles in the condensed liquid;

b. recovering from said disengaging zone a liquid oil bottoms material comprising catalyst particles, condensed effluent, and first and second liquid hydrocarbon stream material from said disengaging zone;

c. separating said bottoms material into a slurry oil containing catalyst particles and a clarified oil substantially free of catalyst particles;

d. recycling slurry oil to said disengaging zone as said first liquid hydrocarbon stream and clarified oil as said second liquid hydrocarbon stream;

e. recycling heavy cycle oil from said fractionation zone to said catalyst disengaging zone; and, f. passing effluent vapors substantially free of entrained catalyst particles from said catalyst disengaging zone into said fractionation zone, to thereby preclude the passage of catalyst particles into said fractionation zone.

6. A fluidized catalytic cracking process which comprises:

a. contacting a feed stock with a fluidized catalyst in a reaction zone at reaction conditions to effect the cracking of said feed into a cracked product effluent vapor;

b. separating effluent vapors which contain entrained catalyst particles from fluidized catalyst;

c. contacting said effluent vapors, in a catalyst disengaging zone, with a first liquid hydrocarbon stream and thereafter with a second liquid hydrocarbon stream at conditions to condense a portion of said effluent vapors and recover entrained catalyst particles in the condensed liquid;

d. recovering a heavy liquid oil bottoms material comprising catalyst particles, condensed effluent and first liquid stream material from said catalyst disengaging zone;

e. separating said heavy liquid oil bottoms material into a slurry oil containing catalyst particles and a clarified oil substantially free of catalyst particles;

f. recycling slurry oil to said catalyst disengaging zone as said first liquid hydrocarbon stream and clarified oil as said second liquid hydrocarbon stream; and, g. recovering effluent vapors substantially free of entrained catalyst particles from said catalyst disengaging zone.

7. The process of claim 6 wherein said effluent vapors of step (g) are passed into a fractionation zone for separation into various boiling fractions.

8. The process of claim 6 wherein said first and second liquid stream materials recycled to said disengaging zone are cooled prior to passage into that zone.

9. A fluidized catalytic cracking process which comprises:

a. contacting a hydrocarbon feed stock with a fluidized catalyst in a reaction zone at reaction conditions to effect the cracking of said hydrocarbon;

b. separating from fluidized catalyst a stream of effluent vapors containing entrained catalyst;

c. contacting said stream of effluent vapor, in a lower portion of a catalyst disengaging zone, with a first liquid hydrocarbon stream and thereafter with a second liquid hydrocarbon stream at conditions to condense a portion of said effluent vapors and recover entrained catalyst particles in the condensed liquid;

d. recovering from said lower portion of the catalyst disengaging zone a heavy liquid oil bottoms material comprising catalyst particles, condensed reaction zone effluent and liquid hydrocarbons from said first and said second liquid hydrocarbon streams of step (c);

e. passing the remaining portion of said effluent vapor into an upper portion of said catalyst disengaging zone, said upper portion of the catalyst disengaging zone being designed to promote the fractionation of the effluent vapor;

f. contacting said remaining portion of said effluent vapor with a third liquid hydrocarbon stream comprising a heavy cycle oil stream in said upper portion of the catalyst disengaging zone to thereby cool said effluent vapor and cause the condensation of heavier hydrocarbons contained in the effluent vapor;

g. recovering effluent vapor substantially free of entrained catalyst particles from said upper portion of the catalyst disengaging zone;

h. recovering from said upper portion of the catalyst disengaging zone a bottoms stream of liquid hydrocarbons comprising condensed effluent vapor material;

i. separating said heavy liquid oil bottoms material recovered from said lower portion of the catalyst disengaging zone into a slurry oil containing catalyst particles and a clarified oil having lower concentration of catalyst particles; and, j. recycling slurry oil to said lower portion of the catalyst disengaging zone as said first liquid hydrocarbon stream and clarified oil as said second liquid hydrocarbon stream.

10. The process of claim 9 wherein a portion of said bottoms stream of liquid hydrocarbons recovered from the upper portion of the catalyst disengaging zone is recycled to the catalyst disengaging zone as at least a portion of said third liquid hydrocarbon stream.

11. The process of claim 9 wherein at least a part of the slurry oil is charged to the reaction zone.

12. The process of claim 9 wherein said bottoms stream of liquid hydrocarbons recovered from the upper portion of the catalyst disengaging zone is a heavy cycle oil.

* * * * *